United States Patent [19]
Chen et al.

[11] 3,979,774
[45] Sept. 7, 1976

[54] DIGITAL CONTROL SYSTEM AND METHOD FOR THE SYNCHRONIZATION OF AUDIO-VISUAL EQUIPMENT

[75] Inventors: Chun-Fu Chen, North Canton; Duane O. Hague, Jr., Fairborn, both of Ohio

[73] Assignee: The University of Akron, Akron, Ohio

[22] Filed: Mar. 13, 1974

[21] Appl. No.: 450,897

[52] U.S. Cl. .................................. 360/80; 352/12; 352/15
[51] Int. Cl.² ................. G03B 31/00; G11B 31/00
[58] Field of Search .................. 178/5.8, 69.5 R; 352/12, 14, 15, 16, 19, 17, 25; 360/19, 80; 179/2 TV

[56] References Cited
UNITED STATES PATENTS

| | | |
|---|---|---|
| 3,854,010 | 12/1974 | Yoshino et al. .................... 178/69.5 |
| 3,859,458 | 1/1975 | Takezawa et al. .................. 178/5.8 |
| 3,865,973 | 2/1975 | Masuda et al. .................... 178/69.5 |

*Primary Examiner*—John C. Martin
*Attorney, Agent, or Firm*—Hamilton, Renner & Kenner

[57] ABSTRACT

Disclosed is a digital control system and method for synchronizing audio-visual equipment for the presentation of film slides with corresponding sound narrations. As the film passes through conventional projecting equipment each slide receives a sequential address. Simultaneously, the sound narrations, passing through the audio equipment on a continuous media, receive identification numbers from a pulse generating means indicative of the outset of each narration, which numbers are stored in the system correlated with the proper sequential address. Means are further provided for skipping ahead or back to desired film slides rapidly, without loss of synchronization between the audio and visual portions of the program.

10 Claims, 1 Drawing Figure

U.S. Patent  Sept. 7, 1976  3,979,774
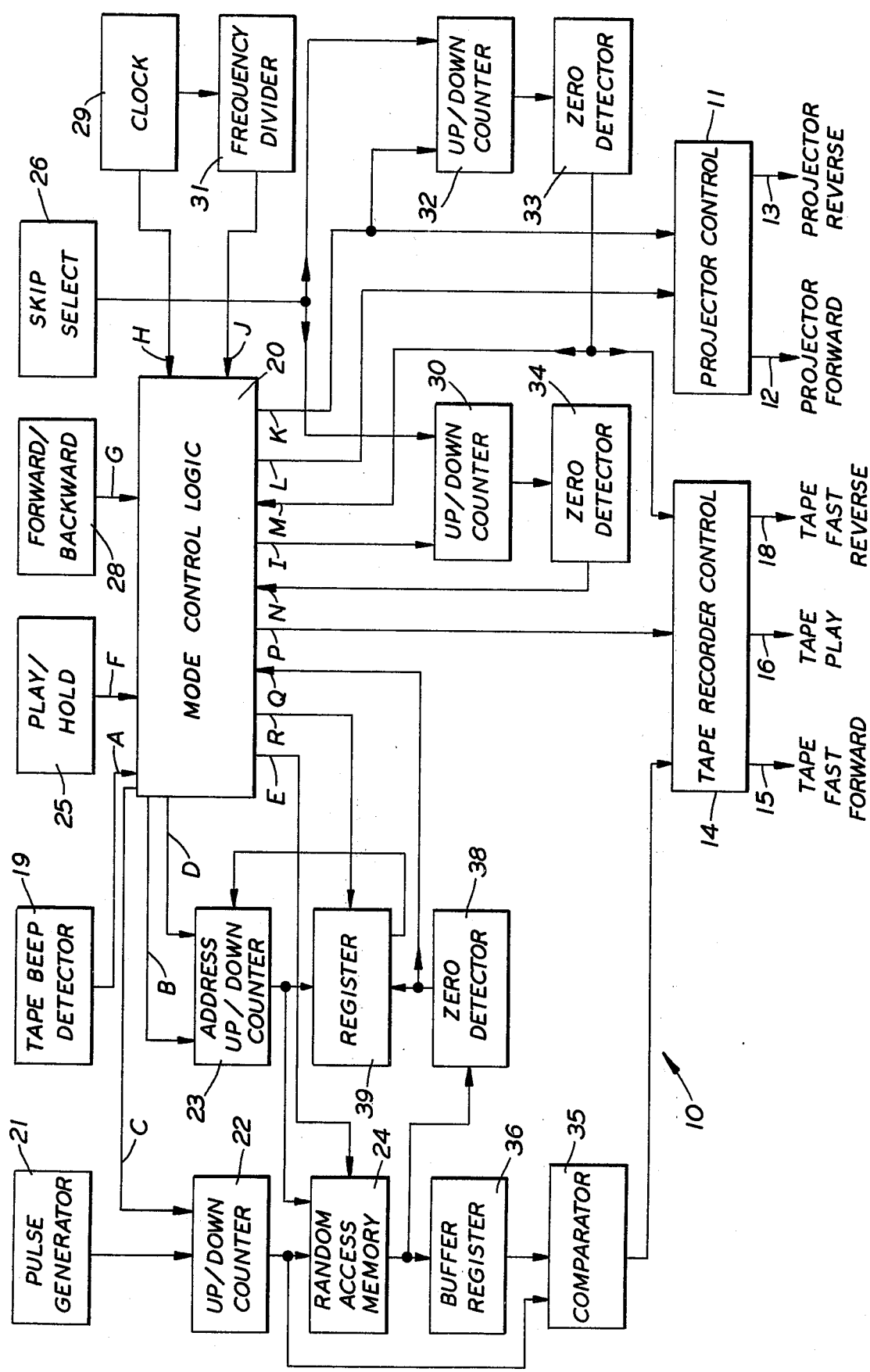

DIGITAL CONTROL SYSTEM AND METHOD FOR THE SYNCHRONIZATION OF AUDIO-VISUAL EQUIPMENT

BACKGROUND OF THE INVENTION

The present invention relates to a control unit for the synchronization of a film projector with a tape recorder which enables the user to readily and automatically skip forward or skip backward one or more frames at will. Projector and recorder units are well known in audio visual education, generally utilizing 35mm slides or film strips and phonograph records or magnetic tape units including the reel-to-reel, cassette and magazine recorders. Projector-recorder units are quite versatile and have been used in all levels of educational institutions, for a variety of commercial, industrial and community purposes as well as for entertainment.

Notwithstanding the universal employment of projector-recorder units and the ready availability of equipment, most existing systems are designed to function only in a forward direction and one frame at a time. The user cannot readily replay or skip ahead several frames, nor can he stop and hold at a desired frame without having to re-synchronize the audio portion of the program, which is not only time consuming, but also tedious.

In general, there are two categories of projector-recorder systems currently available. The first and most rudimentary of the two is the slave system. Characteristically nonreversible, the projector or the operator advances slides or frames in response to a command signal from the audio equipment. The inconvenience arises when it becomes necessary or at least desirable to replay previously viewed frames. The second system, a sound-on-slide projector-recorder, eliminates the deficiency of the first system by placing the prerecorded narration directly on the corresponding slide. However, narration time is necessarily restricted to approximately 30 seconds due to the limited amount of space on each slide.

SUMMARY OF THE INVENTION

It is therefore a primary object of the present invention to provide a digital control system for the synchronization of a film projector with a tape recorder.

It is another object of the present invention to provide a digital control system which automatically synchronizes the sound narration of an audio visual program with the corresponding film slide in response to a skip backward command of X frames where X is a number equal to or less than the number of frames already viewed.

It is yet another object of the present invention to provide a digital control system which automatically synchronizes the sound narration of an audio visual program with the corresponding film slide in response to a skip forward command of Y frames where Y is a number equal to or less than the number of frames remaining in the program, provided that information regarding those frames has been stored in the system.

It is a further object of the present invention to provide a digital control system for the synchronization of a film projector with a tape recorder which is relatively inexpensive and simple to operate.

It is another object of the present invention to provide a digital control system which is readily adaptable for use by an individual in a semi-enclosed module provided with audio visual equipment.

These and other objects of the present invention, together with the advantages thereof over existing and prior art forms which will become apparent from the following specification, are accomplished by the means hereinafter described.

In general, a digital control system for synchronizing audio visual equipment for presenting a plurality of film slides or frames with a related plurality of sound narrations thereof carried by a continuous media includes a pulse generating means operable as the continuous media passes through the audio visual equipment. Also included is a means providing a sequential address for each consecutive film slide as it passes through the audio visual equipment, means providing a pulse identification indicative of the outset of each consecutive sound narration and means to store a pulse identification and to correlate it with a sequential address. Means are further provided to enable the operator to selectively present a given film slide and corresponding sound narration on the audio visual equipment at will.

DESCRIPTION OF THE DRAWING

FIG. 1 is a block schematic diagram of a system embodying the principles of the present invention.

DESCRIPTION OF THE PREFERRED EMBODIMENT

Typical audio-visual equipment includes a projector or similar apparatus for viewing slides or filmstrips of a convenient format, such as 35mm, and a tape recording and play device such as a reel-to-reel recorder or the more common cassette units. The preferred digital control system, depicted schematically in FIG. 1, and referred to generally by the numeral 10, may be readily housed on a control panel or in a suitable box (not shown) for use by an individual at a semienclosed module. Such modules, presently available as a recent innovation in audio-visual presentations, permit an individual student to study a particular subject or program at his own pace without disrupting others similarly engaged. The same digital control system may also be used to synchronize audio-visual programs delivered to a large audience.

The system 10 derives its power from a suitable source such as the conventional line voltage utilized for the projector which voltage is converted to a low D.C. voltage, for example 5 volts. The projector (not shown) is connected to the projector control 11 which provides a signal 12 for forward movement and and a signal 13 for reverse movement. Similarly, the tape recorder (not shown) is connected to the tape recorder control 14 which has at least three output signals, fast forward 15, play 16 and fast reverse 18.

The digital system 10 is designed to work in conjunction with a conventional tape beep detector 19 which automatically signals the projector to advance to the subsequent frame or slide in response to an audio signal carried by the magnetic tape. A signal from the detector 19 is also fed into a mode control logic circuitry 20 as at input A. The mode control logic 20 has a plurality of various inputs and outputs, the purpose and relations of which will be explained hereinbelow. The electronic components and circuitry comprising the mode control logic 20 are conventional items which may be readily assembled by one possessing ordinary skill in logic devices once he understands the functions to be performed thereby. Although the circuitry employed for the mode control logic 20 is not deemed unique, there being several other logic circuits which will perform as well, one logic circuit we have found to be adequate was described in a technical report entitled "A Low Cost Digital Controller for a Projector/Recorder with a Reversible System" presented by Dr. C. F. Chen, a co-inventor of the present system, at the National Electronics Conference held in Chicago, Illinois during Oct. 8–10, 1973. The complete report has since been available in the Science and Technology Library of our common assignee and is hereby incorporated for the reference of those who do not wish to design an independent logic system.

During presentation of the program, various periods of narration are accorded each slide or frame as necessary. To accurately tie each slide to its respective narration, a pulse generator 21 is provided. The pulse generator 21 may include a conventional light emitting diode (LED)/Phototransistor unit in conjunction with a square reflector material such as bright metal or plastic mounted on one of the tape reels of the recorder. As the magnetic tape passes across the tape play head, a beam of light from the LED is reflected resulting in the generation of a pulse as each corner of the square reflector passes in front of the phototransistor unit, e.g., with every 90° of rotation of the tape reel. Considering a standard 7-inch reel carrying 1200 feet of magnetic tape as exemplary, nearly 5236 pulses are generated during rotation thereof.

The number of pulses generated during presentation of each slide is recorded by a conventional tape address up down counter 22 which counts up as the program progresses forwardly. A 13-bit counter is employed for 1200 feet of magnetic tape although the number of bits may be readily varied depending upon the amount of tape which will be used. Following narration of the first slide, the beep tone is given which commands the projector to advance to the next or second slide. From the control logic 20, in response to the beep tone input A, a pulse is sent through output B to the block number address up down counter 23 which counts the number of slides, assigning a consecutive number or address to each. The outputs C and D from the control logic 20 exhibit two states, high ("1" state) or low ("0" state), and during normal playing or a skip forward mode, as will be explained subsequently, the outputs C and D are "high" enabling the tape address counter 22 and block number address counter 23 respectively to count up.

Simultaneous with the beep tone, the slide number from the block address counter 23 is used as an address to a standard random access memory unit 24 while a signal output E from the control logic 20 enables the memory unit 24 to store the pulse number from the counter 22. Thus, pulse identification numbers indicative of the outset of each consecutive slide are stored at consecutive locations in memory 24, thereby providing correlation between all slides and their respective narrations. The E output is a two-state read/write command for the memory 24. Normally, it maintains a "high" output for reading; however, upon beep detection during normal play, the block number address counter 23 counts up one, while driving the projector forward. The trailing edge of the beep pulse signals a "write" command to store the tape addresses in the memory 24. Again, for exemplification, a 64 word, 14 bit memory unit may be readily employed for storing pulses of up to 64 slides. The extra or 14th bit is a parity unit, which registers "1" at each location within the memory 24 which is storing a tape address, otherwise a "0" is registered, the purpose of which will be explained subsequently.

So long as the program progresses forwardly, uninterrupted, the above sequences are repeated, with memory unit 24 storing at sequential locations therein a pulse identification number corresponding to the outset of each consecutive slide. A play/hold switch 25, having an input F to the control logic 20, is in "play" position at this time. However when it is desirable to skip slides in either forward or a reverse direction, the switch 25 is moved to the "hold" position which disables the normal tape play mode of the recorder through control logic output P, to be hereinafter described, as well as a gate in control logic 20 which inhibits the output B. Projector control 11 is also disabled by output K, to be hereinafter described.

To skip slides in a reverse direction, as for a replay or review of a portion of the program, first the switch 25 is moved to "hold," as just described, and then the skip size select button 26 is depressed a number of times equal to the number of slides it is desired to skip. That number must in turn be less than or equal to the present number on the block number address counter 23. The forward/reverse switch 28 is moved to "reverse." The switch 28 is preferably a double-pole double-throw toggle switch having an input G into the control logic 20. In the reverse position, the P signal from control logic 20, to be hereinafter described, disables the forward operation of the tape recorder and a one-second pulse is generated within mode control logic 20. The leading edge of the pulse disables the tape play mode within control logic 20 and the trailing edge of the pulse enables the reverse mode while the tape address and block number counters, 22 and 23, respectively, go to a countdown mode through output C and D respectively of control logic 20. In the event the skip number is greater than the block number address, e.g., ten before the tenth slide has been displayed, mode control logic 20 does not enable the switch 28 resulting in no movement of either the projector or the recorder, readily indicating to the operator that he has fed an incorrect command into the system 10.

The rate at which skipping in either a forward or reverse direction can take place is controlled by two clock pulses of different frequencies. Each of the slower clock pulses enables the projector to advance or reverse a desired number of frames. The fast clock pulse not only activates the tape recorder but also is necessary for the rapid determination of the new slide location. In the event the operator has fed an incorrect skip command to the system 10, in either direction, the error must be recognized and the skipping disabled before the slow clock pulse can advance or reverse a single frame, otherwise synchronization could be lost.

The fast clock 29, having an input H to the control logic 20 provides high frequency pulses, e.g., 100 Hz, through output I to an up down counter 30 for the tape recorder only when control logic circuitry 20 receives a "hold" signal (F) from switch 25 and a forward or reverse signal (G) from switch 28. Similarly, a bank of frequency dividers 31, having an input J, convert the high frequency pulses to a slow clock pulse, e.g., 0.5 Hz, which is sent from the control logic 20 at output K to another up down counter 32 for the projector and to the projector control 11. Assuming it is desired to back up three slides, the skip size select button 26 is depressed four times and the counter 30 counts up to 3 and then counts down "-3-2-1-0-" from the high frequency clock output I, as does the slow counter 32 from the slow clock output K. In addition to clocking the counter 32 to count down, the output K also signals the projector control 11 to move the slides. As to direction of movement, another control logic output L, exhibits two states, high and low, dependent upon the setting of switch 28; in the "high" state the projector is driven backward and in the "low" state it is driven forward.

When "0" is reached by the counter 32, the zero detector 33, also exhibiting two states, is enabled feeding a "high" input M into the control logic 20. As soon as the M input becomes "high" the K output is disabled and a one-second pulse is generated in control logic 20. The leading edge of the pulse clears the reverse mode and restores the counting up mode and the trailing edge of the pulse returns to the play mode. At this time the system 10 is ready for normal forward play of the program by moving the switch 25 to "play" (high).

Simultaneous with reverse of the projector, but at a much faster rate, the high frequency I output signals the counter 30 to count down "-3-2-1-0-." A similar zero detector 34, exhibiting two states, is enabled at "0" and feeds a "high" input N to the control logic 20. The same 100 Hz pulse from clock 29 is also fed to the block number address counter 23 through output B from control logic 20 to select the proper slide address number. As soon as the input N goes to "high," the fast clock 29 is inhibited in mode control logic 20 and either fast forward 15, or in this instance, fast reverse 18 from the tape recorder control 14 is activated by the output P from control logic 20.

The output P from the control logic 20 provides two mode signals, a two state forward mode and a two state reverse mode. During normal play, both mode lines are disabled ("low" state). In reverse, the reverse mode line is "high" when switch 25 is in "hold" and switch 28 is in "reverse." Similarly, for forward skipping, described hereinbelow, the forward mode line is "high" when switch 25 is in "hold" and switch 28 is in "forward." As soon as the new slide or block number address is available, i.e., the number of the slide counted down to, the information from the corresponding location in the memory unit 24 is selected. During the entire operation of the system 10, the pulse number in the up down counter 22 is being received by a comparator 35. A lower pulse number, corresponding to the slide to which the program will be reversed, is read in a buffer register 36 from memory unit 24 and sent to the comparator 35. The tape recorder, activated in "fast reverse" 18, continues its reverse until the tape address up down counter 22 counts down to the new lower pulse number. When both numbers are identical in the comparator 35 and the projector zero detector 33 detects "0," a play re-trigger pulse of 1-second is generated, as described above. Briefly summarizing, the leading edge of the pulse clears the reverse mode and restores the counting up modes and the trailing edge triggers the return to play mode which is in "hold." Movement of the play/hold switch 25 to "play" restores normal forward operation.

Inasmuch as the tape recorder may complete its command before the projector does owing to the relative frequencies of the fast clock and the slow clock which provide the skip pulses for the recorder and projector respectively, the tape play of the recorder is normally disabled at this time until a signal from zero detector 33 is fed to tape recorder control 14 to enable the same. An additional feature may be necessary with respect to the reverse skip mode. When the recorder actually completes skipping in the reverse mode before the projector, the recorder will drive the tape one tape reel pulse beyond the desired location. Upon return to the normal play mode, part of the previous command signal could be detected, resulting in the loss of synchronization between the recorder and projector. In order to circumvent this occurence, the detected beep command should last for more than two tape reel pulses. As one skilled in the art would recognize, a circuit may be employed which will not allow any output signals from the control logic 20 when the detected beep command is less than two tape reel pulses.

If it be desired to skip in a forward direction, the operation is similar to the skip reverse command. First, the play/hold switch 25 is moved to "hold," then the skip size select button 26 is depressed a given number of times corresponding to the number of slides it is desired to skip and then the forward/reverse switch 28 is moved to "forward" disabling the reverse mode with generation of a one-second pulse. The leading edge of the pulse clears the tape play mode while the trailing edge enables the fast forward mode 15 of the tape recorder control 14.

The fast clock 29 provides a pulse through output I to the counter 30 while the slow clock pulse from output K goes to counter 32, both counters counting the number of slide/tape sections to be skipped. The output K also enables the projector control logic 11 to advance the desired number, while output L enables the forward signal 12. Assuming the operator has not mistakingly attempted to skip forward to a slide/tape section not contained in the memory 24, the skipping operation proceeds in a similar manner in "forward" as previously described in "reverse" skip and will not be repeated.

Obviously skipping "forward" is only useful when repeating a given audio-visual program and only after all slide/tape sections, i.e., block number addresses and corresponding tape pulse numbers, have been stored in the memory unit 24. If, for example, the operator, viewing a program for the first time having thirty slides, has seen the first ten slides, he may reverse and repeat any or all of these. However, he is not able to subsequently advance, in fast forward, beyond the first ten slides inasmuch as the remaining twenty slides are not yet in the memory unit 24.

Occasionally, the operator may attempt to skip more slide-tape sections than are in the memory unit 24. It is to be remembered that counting to the new position is controlled by the fast clock pulse, frequency 100 Hz, and therefore the new block number is derived before the projector receives a signal to move. When the new location is one which has not yet been stored in the memory unit 24, the 14th bit, or parity unit, at that location is "0" as stated hereinabove. The "0" is immediately detected by another zero detector 38 which presents a "high" state input Q into the mode control logic 20. Output R from the control logic 20 provides a signal to a register 39, when the parity unit is "0," which restores the old block number address at the counter 23. Lastly, the "0" parity unit disables the slow clock pulse and resets the counter 32 for the projector to zero so that no advance of the slides will occur.

Thus, once the operator has viewed the entire audio visual program so as to store all necessary information in the memory unit 24 of the system 10, he is then able to replay the program as often as he desires, skipping to those sections which he wishes to emphasize and over those sections which he has mastered. Of course, to clear the entire program, as at the end of a session, or to enter a new program, he need only stop the power input to the system 10 by turning it off. During operation of the system 10, and the foregoing description thereof, a plurality of 1-second pulses are generated in response to movement of a switch such as the skip select switch 28. The 1-second interval is provided to allow a mechanical stabilization of the tape recorder between modes. Thus, a subsequent command of an opposite skip direction is not obeyed until the mode from the previous command has been completed. In such an instance, the latter command will not be enabled until one-second after the former command has been completed.

It should now be evident that the disclosed system carries out the objects of the invention set forth above. As will be apparent to those skilled in the art, many modifications can be made without departing from the spirit of the invention herein disclosed and described, the scope of the invention being limited solely by the scope of the attached claims.

What is claimed is:

1. A control system for synchronizing audio-visual equipment which presents a plurality of visual representations coordinated with a like plurality of sound narrations carried by a continuous media comprising: means to generate pulses as the continuous media carrying said sound narration passes through the audio-visual equipment, means providing a sequential address for each consecutive visual representation passing through the audio-visual equipment, means receiving the pulses from said means to generate pulses and providing a pulse identification for each consecutive sound narration, means having consecutive locations for each said sequential address to store said pulse identification and to thereby correlate a said pulse identification with a said seqeuntial address for subsequent selective presentation, and means to selectively present given audio-visual sections on the audio-visual equipment, each said section including a visual representation and corresponding sound narration.

2. A control system, as in claim 1, wherein the continuous media carrying the sound narration is a magnetic tape mounted on a reel and said means to generate pulses includes a deflector affixed to said reel and means directing a beam of light at said deflector.

3. A control system, as in claim 2, wherein said deflector affixed to said reel is square and said means directing a beam of light is positioned in front of said deflector so as to generate one pulse with each 90° rotation of said reel.

4. A control system, as in claim 1, wherein said means providing a sequential address for each consecutive visual representation includes a block number address counter means for counting each consecutive visual representation and wherein said means to store includes a random access memory unit.

5. A control system, as in claim 4, wherein said means providing a pulse identification for each consecutive sound narration comprises: tape address counter means for counting the number of pulses existing in each consecutive sound narration so as to provide a number for each consecutive sound narration, each said number being stored in said memory unit at the location of the corresponding sequential address.

6. A control system, as in claim 5, wherein said number corresponds to the pulse identification indicative of the outset of each consecutive sound narration.

7. A control system, as in claim 5, wherein said means to selectively present given audio-visual sections on the audio-visual equipment includes a first switch for signalling commands to skip a desired number of said sections and a second switch for selecting the direction of said skipping between a forward mode and a reverse mode.

8. A control system, as in claim 7, wherein said means to selectively present given audio-visual sections further includes: first and second counter means to register said desired number of skip commands and first and second clock means to provide pulses to said counter means so that said address counter means enables said memory unit to determine said pulse identification of said given audio-visual section and second clock means to provide pulses at a lower frequency than said first clock means, whereby said first and said second clock means activiate the audio-visual equipment.

9. A method for the synchronization of audio-visual equipment for presenting a plurality of visual representations coordinated with a like plurality of sound narrations carried by a continous media comprising the steps of: generating a series of pulses as the continuous media carrying said sound narration passes through the audio-visual equipment, counting each consecutive visual representation passing through the audio-visual equipment, providing a pulse identification for each consecutive sound narration, and storing, in a means having consecutive locations for each said consecutive visual representation, the pulse identification for each consecutive sound narration thereby correlating each said visual representation with a said pulse identification.

10. A method for the synchronization of audio-visual equipment, as in claim 9, wherein the pulse identification for each said consecutive sound narration is related to a consecutive visual representation.

* * * * *